(12) United States Patent
Cloutier

(10) Patent No.: US 11,184,445 B2
(45) Date of Patent: Nov. 23, 2021

(54) SYSTEM AND METHOD OF ESTABLISHING COMMUNICATION BETWEEN USERS

(71) Applicant: Jean-Michel Michel Cloutier, Nicolet (CA)

(72) Inventor: Jean-Michel Michel Cloutier, Nicolet (CA)

( * ) Notice: Subject to any disclaimer, the term of this patent is extended or adjusted under 35 U.S.C. 154(b) by 0 days.

(21) Appl. No.: 17/033,815

(22) Filed: Sep. 27, 2020

(65) Prior Publication Data
US 2021/0099529 A1 Apr. 1, 2021

(51) Int. Cl.
*G06F 15/16* (2006.01)
*H04L 29/08* (2006.01)

(52) U.S. Cl.
CPC .......... *H04L 67/146* (2013.01); *H04L 67/306* (2013.01); *H04L 67/34* (2013.01)

(58) Field of Classification Search
CPC ...... H04L 67/146; H04L 67/34; H04L 67/306
USPC ......................................................... 709/219
See application file for complete search history.

(56) References Cited

U.S. PATENT DOCUMENTS

| | | | | |
|---|---|---|---|---|
| 7,213,032 B2* | 5/2007 | Mascarenhas | ......... | G06Q 30/02 707/781 |
| 9,264,391 B2* | 2/2016 | Castera | ................... | H04L 51/22 |
| 9,275,127 B1* | 3/2016 | Liao | ....................... | G06F 16/285 |
| 9,350,598 B2* | 5/2016 | Barak | ...................... | H04L 67/02 |
| 10,038,683 B2* | 7/2018 | Barak | ...................... | H04L 63/08 |
| 2014/0122622 A1* | 5/2014 | Castera | ................... | H04L 51/04 709/206 |
| 2016/0134580 A1* | 5/2016 | Castera | ............... | G06F 16/9024 715/752 |
| 2017/0054701 A1* | 2/2017 | Barak | ..................... | H04L 51/32 |
| 2017/0308866 A1* | 10/2017 | Dotan-Cohen | ..... | H04L 43/0876 |
| 2019/0279053 A1* | 9/2019 | Bourdev | ................ | G06K 9/726 |

* cited by examiner

*Primary Examiner* — Moustafa M Meky

(57) ABSTRACT

Disclosed is a method and system (102) for establishing communication between users. The method comprises receiving, from a first user operating on a social networking platform, a unique identifier associated with a second user to whom the first user wishes to send an anonymous notification, for communicating over a social networking platform. A tag is stored over a server for establishing communication between the first user and the second user, on said social networking platform. The tag expires after a predefined time period. The anonymous notification is delivered to the second user, indicating a known person's interest to communicate with the second user. Communication is established between the first user and the second user, over said social networking platform, after the second user correctly predicts the first user to be the sender associated with the anonymous notification, before expiry of the predefined time period associated with the tag.

20 Claims, 4 Drawing Sheets

SYSTEM AND METHOD OF ESTABLISHING COMMUNICATION BETWEEN USERS

CROSS-REFERENCE TO RELATED APPLICATIONS AND PRIORITY

The present application does not claim priority from any patent application.

TECHNICAL FIELD

The present subject matter described herein, in general, relates to the field of data communication, and more particularly to a system and a method for establishing communication sessions based on users' thoughts.

BACKGROUND

In today's fast paced existence, one scarcely has the time to get through one's tasks, let alone call friends, family and loved ones to let them know he is thinking of them. Mobile technology and Internet has made things convenient and there are a plethora of social networking platforms, such as Facebook, Whatsapp, SnapChat, and Telegram, where one can send and receive messages to and from anyone, anywhere in the world. However, such social networking platforms require the users to write content to connect with other users. There does not exist a platform where communication could be initiated and established based on thoughts of users. Therefore, a need arises to develop a system and a method that could assist in development of a social networking platform using which users could be connected based on their thoughts.

SUMMARY

Before the present systems and methods of establishing communication between users are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application.

This summary is provided to introduce aspects related to a system and a method of establishing communication between users. This summary is not intended to identify essential features of the claimed subject matter nor is it intended for use in determining or limiting the scope of the claimed subject matter.

In one implementation, a system for establishing communication between users is disclosed. In one aspect, the system comprises a memory and a processor coupled to the memory. Further, the processor may be capable of executing instructions in the memory to perform one or more steps. In the aspect, the system may receive, from a first user operating on a social networking platform, a unique identifier associated with a second user to whom the first user wishes to send an anonymous notification, for communicating over said social networking platform. The system may further store, over a database, a tag for establishing communication between the first user and the second user, on said social networking platform. The tag expires after a predefined time period. The system may deliver the anonymous notification to the second user, indicating a known person's interest to communicate with the second user.

The system may determine existence of a profile of the second user on said social networking platform. The second user may be allowed to download a software application of said social networking platform over a user device, while the second user does not have the profile on said social networking platform. The second user may be allowed to predict identity of sender associated with the anonymous notification. The second user may be provided with two or more user profiles existing on said social networking platform, for predicting the identity of sender associated with the anonymous notification. Further, a suggestion may be provided to the second user for predicting the identity of sender of the anonymous notification. The suggestion includes one or more identifiers related to the first user. The one or more identifiers related to the first user comprise a date of birth, birth place, current location, and group photo. Communication may be established between the first user and the second user, using the tag, over said social networking platform, after the second user correctly predicts the first user to be the sender associated with the anonymous notification, before expiry of the predefined time period associated with the tag. Further, one or more of a profile, message, user device information, and geolocation, of the first user may be shared after the second user correctly predicts the first user to be the sender associated with the anonymous notification, before expiry of the predefined time period associated with the tag. The tag may be deleted without establishing the communication between the first user and the second user, over said social networking platform, after the second user incorrectly predicts the sender associated with the anonymous notification or when the predefined time period expires.

In one implementation, a method of establishing communication between users is disclosed. In one aspect, the method may comprise receiving, from a first user operating on a social networking platform, a unique identifier associated with a second user to whom the first user wishes to send an anonymous notification, for communicating over said social networking platform. The method may further comprise storing, over a database, a tag for establishing communication between the first user and the second user, on said social networking platform. The tag expires after a predefined time period. The method may further comprise delivering the anonymous notification to the second user, indicating a known person's interest to communicate with the second user.

Existence of a profile of the second user on said social networking platform may be determined. The second user may be allowed to download a software application of said social networking platform over a user device, while the second user does not have the profile on said social networking platform. The second user may be allowed to predict identity of sender associated with the anonymous notification. The second user may be provided with two or more user profiles existing on said social networking platform, for predicting the identity of sender associated with the anonymous notification. Further, a suggestion may be provided to the second user for predicting the identity of sender of the anonymous notification. The suggestion includes one or more identifiers related to the first user. The one or more identifiers related to the first user comprise a date of birth, birth place, current location, and group photo. Communication may be established between the first user and the second user, using the tag, over said social networking platform, after the second user correctly predicts the first user to be the sender associated with the anonymous notification, before expiry of the predefined time period associated with the tag. Further, one or more of a profile, message, user device information, and geolocation, of the first user may be shared after the second user correctly predicts the first user to be the sender associated with the anonymous notification, before expiry of the predefined time period associated with the tag. The tag may be deleted without establishing the communication between the first user and the second user, over said social networking platform, after the second user incorrectly predicts the sender associated with the anonymous notification or when the predefined time period expires.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Although any systems and methods for establishing communication between users, similar or equivalent to those described herein can be used in the practice or testing of embodiments of the present disclosure, the exemplary, methods and systems for establishing communication between users are now described. The disclosed embodiments for establishing communication between users are merely examples of the disclosure, which may be embodied in various forms.

Various modifications to the embodiment will be readily apparent to those skilled in the art and the generic principles herein may be applied to other embodiments for establishing communication between users. However, one of ordinary skill in the art will readily recognize that the present disclosure for establishing communication between users is not intended to be limited to the embodiments described, but is to be accorded the widest scope consistent with the principles and features described herein.

Figure 1:
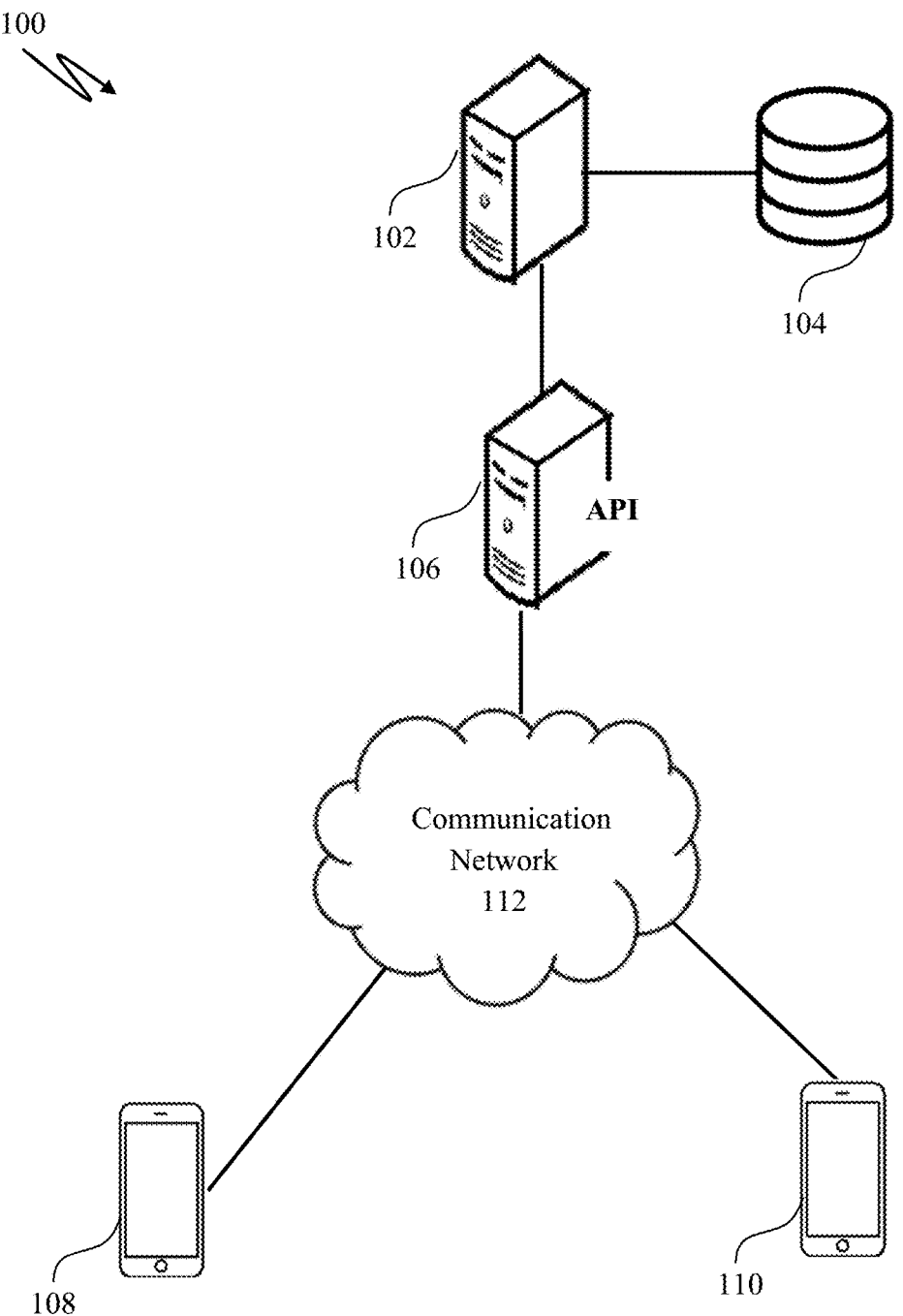
FIG. 1 illustrates a network architecture diagram 100 of a system 102 and user devices 104 connected together for establishing communication between users, in accordance with an embodiment of the present subject matter.

Referring now to FIG. 1, a network implementation diagram 100 of a system 102 for establishing communication between users, in accordance with an embodiment of the present subject matter may be described. The system 102 may be connected with a database 104 for storing data related to users and/or data related to communication established between the users. The system 102 may be connected to and accessed through an Application Programming Interface (API) server 106. User devices 108 and 110 may connect to the API server 106, to connect with the system 102, through a communication network 112. Although illustrated herein a user-server architecture, other embodiments may include other network architectures, such as peer-to-peer or distributed network environments.

It should be understood that the system 102, the API server 106, and the user devices 108 and 110 are different computing devices and may be implemented in a variety of computing systems, such as a laptop computer, a desktop computer, a notebook, a workstation, a mainframe computer, a server, a network server, a cloud-based computing environment, and a mobile.

In one implementation, the communication network 112 may be a wireless network, a wired network, or a combination thereof. The communication network 112 can be implemented as one of the different types of networks, such as intranet, Local Area Network (LAN), Wireless Personal Area Network (WPAN), Wireless Local Area Network (WLAN), wide area network (WAN), the internet, and the like. The communication network 112 may be either a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further, the communication network 112 may include a variety of network devices, including routers, bridges, servers, computing devices, storage devices, and the like.

Figure 2:
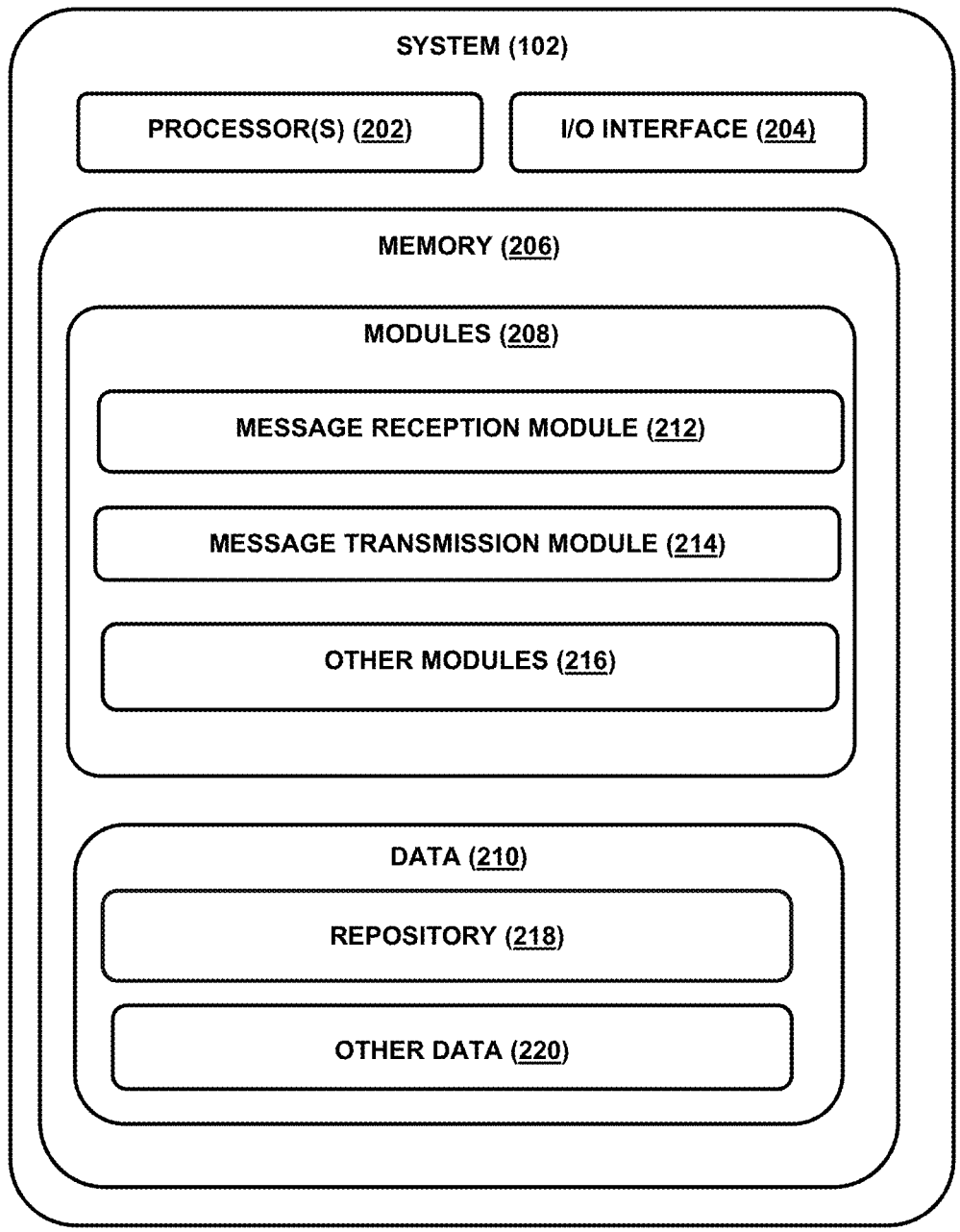
FIG. 2 illustrates a block level diagram of the system 102, in accordance with an embodiment of the present subject matter.

Referring now to FIG. 2, a block diagram 200 of the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, a command line interface, and the like. The I/O interface 204 may allow a user to interact with the system 102. Further, the I/O interface 204 may enable the system 102 to communicate with the user devices 108 and 110, and other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206, amongst other things, serves as a repository for storing data processed, received, and generated by one or more of modules 208. The memory 206 may include any computer-readable medium or computer program product known in the art including, for example, volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes.

The memory 206 may include data generated as a result of the execution of one or more of the modules 208. In one implementation, the memory 206 may include data 210. The modules 208 include routines, programs, objects, components, data structures, etc., which perform particular tasks or implement particular abstract data types. In one implementation, the modules 208 may include a message reception module 212, a message transmission module 214, and other modules 216. The other modules 216 may include programs or coded instructions that supplement applications and functions of the system 102. The modules 208 described herein may be implemented as software modules that may be executed in the cloud-based computing environment of the system 102.

The data 210 may include a repository 218 for storing data processed, computed, received, and generated by one or more of the modules 208. Furthermore, the data 210 may include other data 220 for storing data generated as a result of the execution of one or more modules in the other modules 216.

The method of establishing communication between users, as described in several embodiments of current disclosure, could be implemented as a novel social networking application. The process of establishing communication between users begins with a first user getting a thought of a second user which could be a friend or someone known to the first user. The first user operating on said social networking platform may provide a unique identifier associated with the second user. Such unique identifier may include a name, account identity, email address, and a phone number of the second user. Corresponding to such unique identifier of the second user, a tag may be stored over the system 102, for allowing communication between the first user and the second user, on said social networking platform. The tag may remain active only for a predefined time period and may expire after such time period. Subsequent to creation of the tag, an anonymous notification may be delivered to the unique identifier associated with the second user. The anonymous notification may be indicative of a known person's interest to communicate with the second user.

Figure 3:
FIG. 3 illustrates an exemplary User Interface (UI), in accordance with an embodiment of the present subject matter.

FIG. 3 illustrates an exemplary User Interface (UI) showing receipt of an anonymous notification over a user's device. Based on the second user's input, the anonymous notification may redirect the second user to the social networking application, where the second user will be allowed to predict identity of sender of the anonymous message. To assist in making such prediction, one or more suggestions/clues may be provided to the second user. Further, number of attempts of making such prediction must be predefined and limited. Further, the attempts must be made within a predefined time period, else the corresponding may expire, and the second user may no longer be able to connect with the sender of the anonymous message. In case, the second user correctly predicts the identity of the sender of the anonymous message i.e. identifies the sender to be the first user, the second user may be provided with relevant details associated with the first user and/or connection may be established between the second user and the first user, over the social networking application, for an unlimited period of time.

Figure 4:
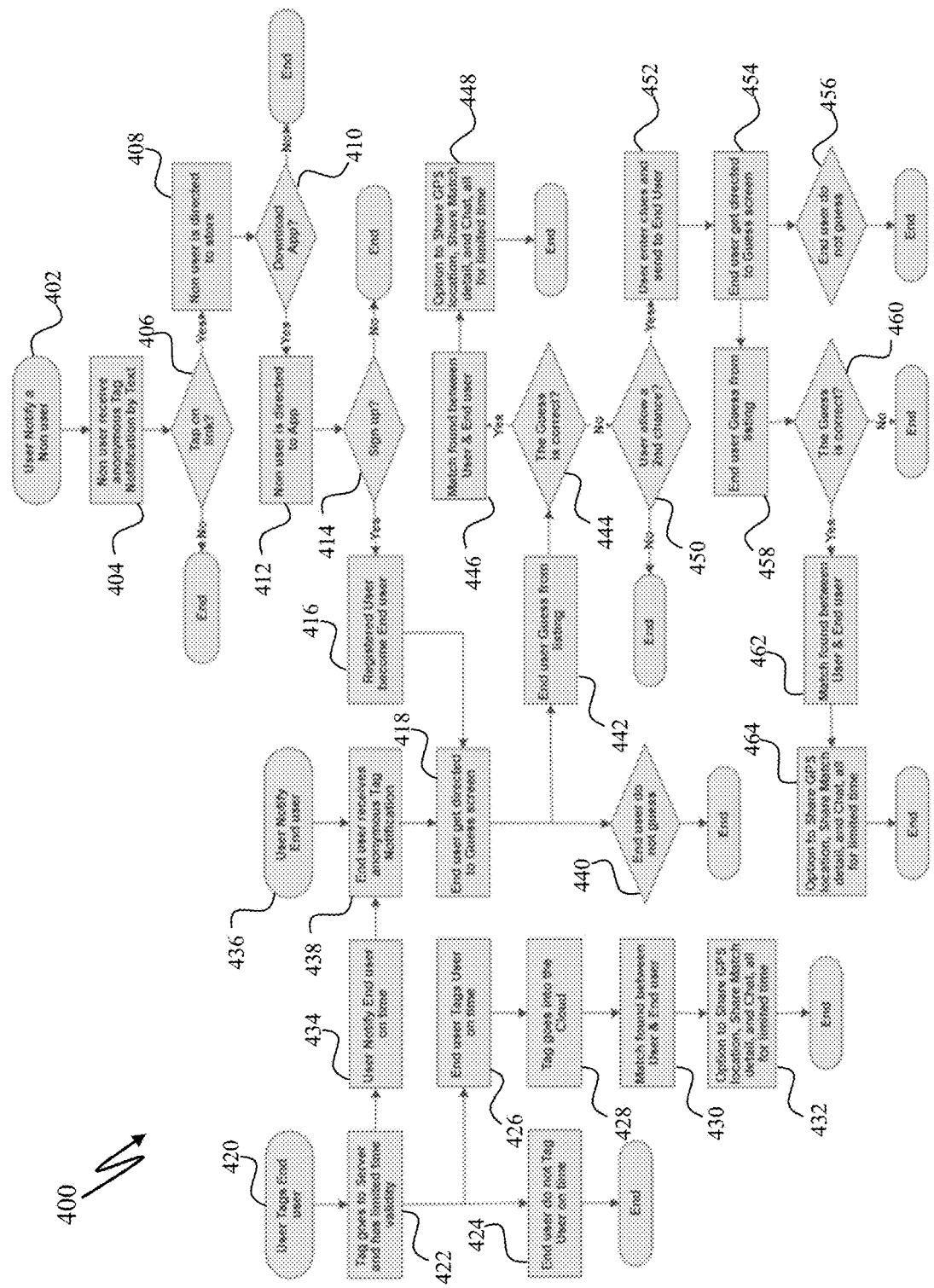
FIG. 4 illustrates a method 400 of establishing communication between users, in accordance with an embodiment of the present subject matter.

Referring now to FIG. 4, a method 400 of establishing communication between users is described, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types.

The order in which the method 400 of establishing communication between users is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

In one example, a user (person having a profile on said social networking application) may get a thought of a non-user (person not having a profile on said social networking application), for example a first user may think about a second user. The second user may be a friend or someone known to the first user. It must be understood that the non-user could be a user i.e. a person having a profile on said social networking application, in other scenarios. When the user get a thought of the non-user, the user may notify the non-user, for example the first user may notify the second user, at block 402. Upon being notified by the first user, the non-user (second user) may receive an anonymous tag notification, at block 404. Such anonymous tag notification may be delivered as a text message, email, system generated call, or as a notification over an existing social networking platform. Further, such anonymous tag notification may include a hyper/web link to access a webpage where the non-user (second user) may be allowed to predict identify of sender of the anonymous tag notification.

At block 406, when the non-user (second user) clicks on the link, he may be directed to an application store, at block 408. On the application store, the non-user (second user) may download a software application/mobile application to access said social networking platform, at block 410. Upon downloading, the non-user (second user) may be directed to the software application/mobile application, at block 412. The non-user (second user) may be asked to sign-up over said social networking platform, at block 414. Post sign-up, the non-user (second user) would get registered over said social networking platform and may be identified as an end user, at block 416. Thereupon, the end user (second user) may be directed to a guess screen where he may be prompted to predict identity of sender of the anonymous tag notification, at block 418.

At block 420, the user (first user) may tag the end user (second user). During such instance, the tag may be stored over the system 102 or a cloud server, at block 422. It should be noted that the tag may be associated with a predefined time period after which the tag may expire. In one case, when the end user (second user) do not tag the user (first user) within the predefined time period, at block 424, communication thread may break and the program may end. In another case, the end user (second user) may tag the user (first user) within the predefined time period, at block 426. In such instance, the tag may be stored over the system 102 or a cloud server, at block 428. Thereupon, a match may be found between the user (first user) and the end user (second user), at block 430, and at least one of the user (first user) and the end user (second user) may be provided with an option to share Global Positioning System (GPS) location, share matching details and to communicate/chat with each other for an unlimited time period, at block 432. A detailed process of finding match between users and exchange of information between users is described below with greater detail.

After the tag is stored over the system 102 or a cloud server, at block 422, the user (first user) may notify the end user (second user) on time, at block 434. Alternatively, the user (first user) may notify the end user (second user) at block 436. In such instances, the end user (second user) may receive an anonymous tag notification, at block 438. Upon clicking the hyperlink present in the anonymous tag notification, the end user (second user) may be directed to the guess screen where he may be prompted to predict identity of sender of the anonymous tag notification, at block 418.

At block 440, when the end user (second user) does not make the prediction, the program may end. Alternatively, the end user (second user) may predict identity of sender of the anonymous tag notification, at block 442. To assist in making such prediction, one or more suggestions/clues may be provided to the end user (second user). Such clue may include a picture of the sender of the anonymous tag notification provided amongst pictures of one or more other users. Similarly, other clues may include a date of birth, current location, or a gender of sender of the anonymous tag notification. At block 444, correctness of the prediction made by the end user (second user) will be determined. In one scenario, when the prediction made by the end user (second user) is determined to be correct, a match will be found between the user (first user) and the end user (second user), at block 446. In such case, at least one of the user (first user) and the end user (second user) may be provided with an option to share Global Positioning System (GPS) location, share matching details and to communicate/chat with each other for an unlimited time period, at block 448.

In an alternate scenario, when the prediction made by the end user (second user) is determined to be incorrect, it may be determined if another chance (second chance) is to be provided to the end user (second user), at block 450. The decision of providing another chance remains with the user (first user). In case the user (first user) wishes to provide another chance to the end user (second user), the user (first user) may feed in new suggestions/clues that may be provided to the end user (second user) for making the prediction, at block 452. After the user (first user) enters the new clues/clues, the end user (second user) may be redirected to the guess screen where he may be prompted to predict identity of sender of the anonymous tag notification, at block 454. At block 456, when the end user (second user) does not make the prediction, the program may end. Alternatively, the end user (second user) may predict identity of sender of the anonymous tag notification, at block 458.

After the end user (second user) provides his input, correctness of prediction made by the end user (second user) may be determined, at block 460. In case the prediction is again incorrect, the program may either be terminated or yet another chance may be provided to the end user (second user) based on a choice of the user (first user). While the prediction made by the end user (second user) is determined to be correct, a match will be found between the user (first user) and the end user (second user), at block 462. In such case, at least one of the user (first user) and the end user (second user) may be provided with an option to share Global Positioning System (GPS) location, share matching details and to communicate/chat with each other for an unlimited time period, at block 464.

In the above described manner, communication is established between users, based on thoughts of the users. Although a communication session is initiated based on a thought of a first user, but the communication session is established after an end user accurately verifies identity of the first user.

Although implementations for methods and systems for establishing communication between users have been described in language specific to structural features and/or methods, it is to be understood that the appended claims are not necessarily limited to the specific features or methods described. Rather, the specific features and methods are disclosed as examples of implementations for classifying components of a product.

I claim:

1. A method of establishing communication between users, the method comprising:
   receiving, from a first user operating on a social networking platform, a unique identifier associated with a second user to whom the first user wishes to send an anonymous notification, for communicating over said social networking platform;
   storing, over a database (104), a tag for establishing communication between the first user and the second user, on said social networking platform, wherein the tag expires after a predefined time period; and
   delivering the anonymous notification to the second user, indicating a known person's interest to communicate with the second user.

2. The method as claimed in claim 1, further comprising determining existence of a profile of the second user on said social networking platform.

3. The method as claimed in claim 2, further comprising allowing the second user to download a software application of said social networking platform over a user device, while the second user does not have the profile on said social networking platform.

4. The method as claimed in claim 3, further comprising allowing the second user to predict identity of sender associated with the anonymous notification.

5. The method as claimed in claim 4, further comprising providing, to the second user, two or more user profiles existing on said social networking platform, for predicting the identity of sender associated with the anonymous notification.

6. The method as claimed in claim 5, further comprising establishing the communication between the first user and the second user, using the tag, over said social networking platform, after the second user correctly predicts the first user to be the sender associated with the anonymous notification, before expiry of the predefined time period associated with the tag.

7. The method as claimed in claim 5, further comprising sharing one or more of a profile, message, user device information, and geolocation, of the first user after the second user correctly predicts the first user to be the sender associated with the anonymous notification, before expiry of the predefined time period associated with the tag.

8. The method as claimed in claim 5, further comprising deleting the tag without establishing the communication between the first user and the second user, over said social networking platform, after the second user incorrectly predicts the sender associated with the anonymous notification or when the predefined time period expires.

9. The method as claimed in claim 4, further comprising providing, to the second user, a suggestion for predicting the identity of sender of the anonymous notification, wherein the suggestion includes one or more identifiers related to the first user.

10. The method as claimed in claim 9, wherein the one or more identifiers related to the first user comprises a date of birth, birth place, current location, and group photo.

11. A system (102) for establishing communication between users, the system (102) comprising:
a processor (202); and
a memory (206) coupled to the processor (202), wherein the memory (206) stores programmed instructions executable by the processor (202) for:
receiving, from a first user operating on a social networking platform, a unique identifier associated with a second user to whom the first user wishes to send an anonymous notification, for communicating over said social networking platform;
storing, over a database (104), a tag for establishing communication between the first user and the second user, on said social networking platform, wherein the tag expires after a predefined time period; and
delivering the anonymous notification to the second user, indicating a known person's interest to communicate with the second user.

12. The system (102) as claimed in claim 11, further comprising determining existence of a profile of the second user on said social networking platform.

13. The system (102) as claimed in claim 12, further comprising allowing the second user to download a software application of said social networking platform over a user device, while the second user does not have the profile on said social networking platform.

14. The system (102) as claimed in claim 13, further comprising allowing the second user to predict identity of sender associated with the anonymous notification.

15. The system (102) as claimed in claim 14, further comprising providing, to the second user, two or more user profiles existing on said social networking platform, for predicting the identity of sender associated with the anonymous notification.

16. The system (102) as claimed in claim 15, further comprising establishing the communication between the first user and the second user, using the tag, over said social networking platform, after the second user correctly predicts the first user to be the sender associated with the anonymous notification, before expiry of the predefined time period associated with the tag.

17. The system (102) as claimed in claim 15, further comprising sharing one or more of a profile, message, user device information, and geolocation, of the first user after the second user correctly predicts the first user to be the sender associated with the anonymous notification, before expiry of the predefined time period associated with the tag.

18. The system (102) as claimed in claim 15, further comprising deleting the tag without establishing the communication between the first user and the second user, over said social networking platform, after the second user incorrectly predicts the sender associated with the anonymous notification or when the predefined time period expires.

19. The system (102) as claimed in claim 14, further comprising providing, to the second user, a suggestion for predicting the identity of sender of the anonymous notification, wherein the suggestion includes one or more identifiers related to the first user.

20. The system (102) as claimed in claim 19, wherein the one or more identifiers related to the first user comprises a date of birth, birth place, current location, and group photo.

* * * * *